Dec. 18, 1962  B. G. GOBBY  3,068,572
TOOTH AND BRIDGE SURVEYING ANALYZER
Filed Aug. 4, 1958  2 Sheets-Sheet 1
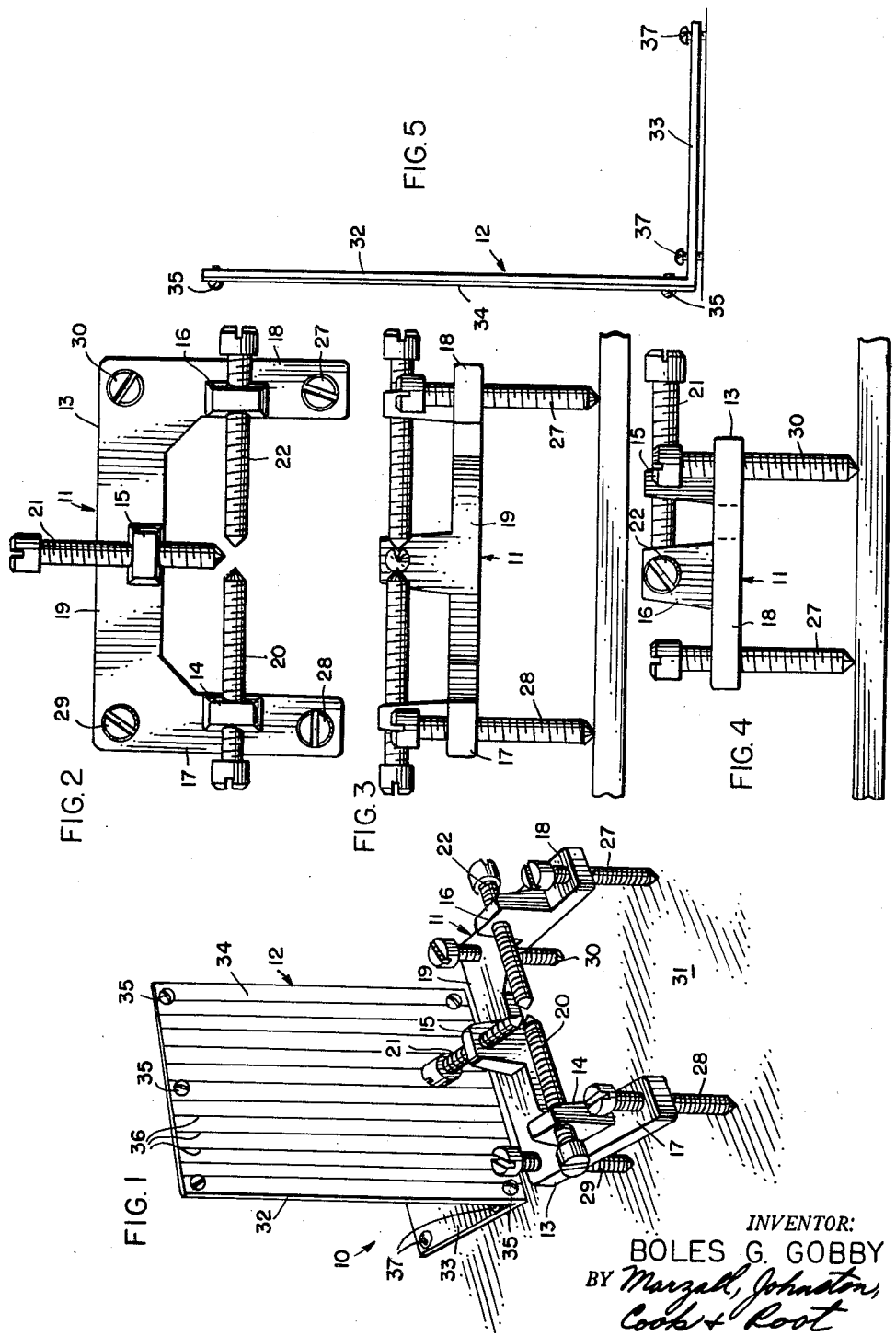
INVENTOR:
BOLES G. GOBBY
BY Marzall, Johnston,
Cook + Root
ATT'YS Dec. 18, 1962  B. G. GOBBY  3,068,572
TOOTH AND BRIDGE SURVEYING ANALYZER
Filed Aug. 4, 1958  2 Sheets-Sheet 2
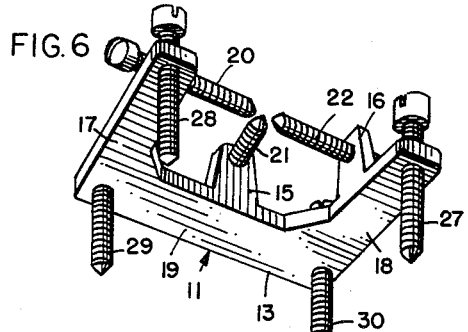
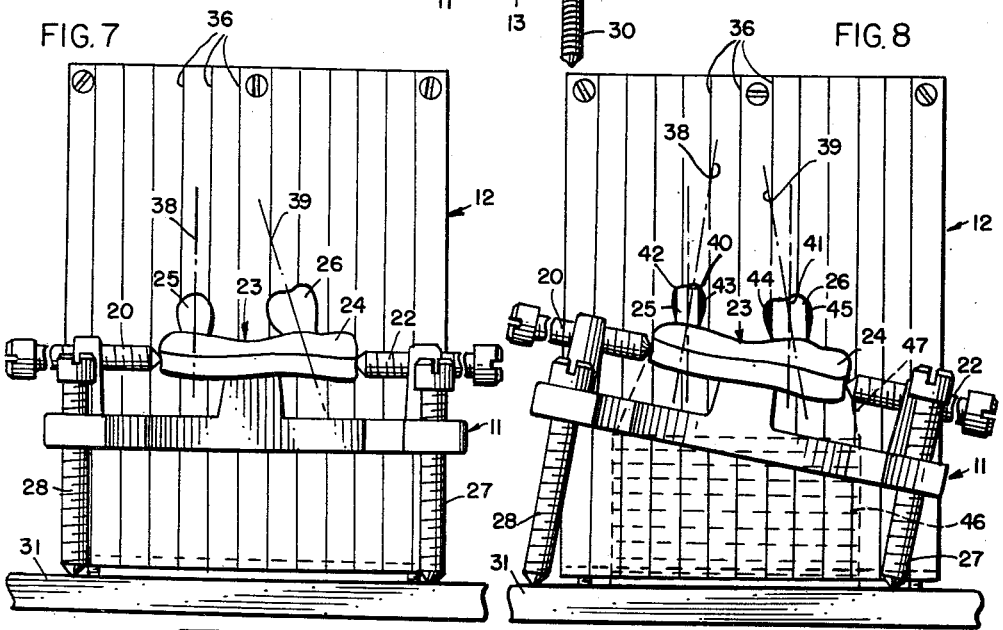
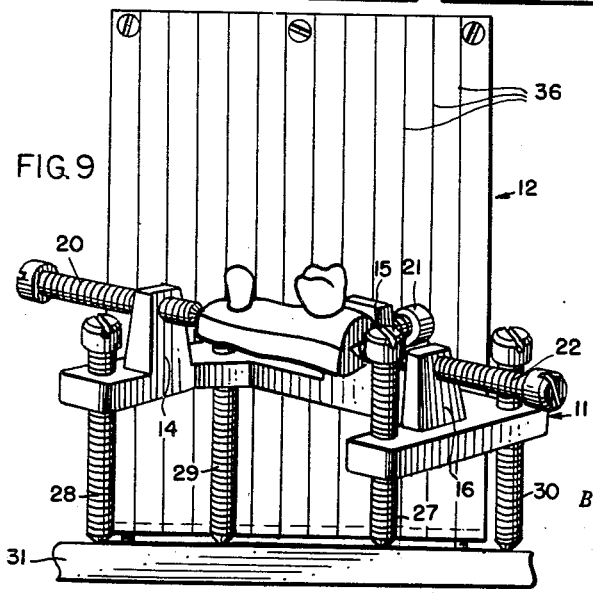
INVENTOR:
BOLES G. GOBBY
ATT'YS

United States Patent Office 3,068,572
Patented Dec. 18, 1962

3,068,572
TOOTH AND BRIDGE SURVEYING ANALYZER
Boles G. Gobby, 5901 S. Rockwell, Chicago 29, Ill.
Filed Aug. 4, 1958, Ser. No. 752,873
3 Claims. (Cl. 32—67)

This invention relates in general to a dental instrument, and more particularly to a tooth and bridge surveying analyzer.

In the planning of dental bridgework, wherein a bridge is to be supported between two or more spaced natural teeth, it is necessary to obtain parallelism when preparing the teeth for the bridgework to insure proper seating of the bridgework. Thus, the specific problem is to obtain the optimum position of the spaced natural teeth, and especially of divergent teeth, before the teeth are prepared. Heretofore, the teeth generally have been analyzed and surveyed prior to preparation while in the mouth of the patient, in which case a thorough job of analyzing cannot be obtained since the area in the mouth including the teeth can only be seen from a few angles. An advance from this method was to take an accurate impression of the teeth and area in the mouth and prepare from the impression a dental cast or model. This dental cast could then be surveyed and analyzed without interference from the lips, cheeks, tongue, and other parts of the mouth. However, study of such a model made by the eye alone would not always result in obtaining the desired result, which would be to have the completed bridge seat with a minimum of resistance or lateral pressure on the supporting teeth. Occasionally, if the seating were forced it would cause considerable discomfort to the patient due to the unnatural pressures. If these pressures were great enough and discomfort continued the bridge would have to be removed, re-analyzed and re-constructed, while if properly made in the first place would give the patient comfort, chewing or biting efficiency, esthetics, and will prolong the life of the abutment teeth, providing that good mouth hygiene is maintained.

When it is necessary to reconstruct a dental bridge, it requires the making of new impressions and dental casts, which inconveniences and annoys a patient, results in time lost by the dentist and patient, incurs an additional cost to the dentist, and ultimately turns what could be a favorable and profitable experience into an unfavorable result and a financial loss. However, if all interference were eliminated before the bridgework was made and installed, a proper fit would be made thereby obviating any trouble to the dentist when seating the bridge and will give comfort and service to the patient.

Accordingly, it is an object of this invention to provide a dental instrument which obviates the above enumerated difficulties.

Another object of this invention resides in the provision of an improved tooth and bridge surveying analyzer.

Still another object of this invention is in the provision of a tooth and bridge surveying analyzer which permits a dentist to study, survey and analyze teeth in the planning of dental bridgework whereby all guess work is eliminated and a dental bridge can be constructed and installed successfully with a minimum of time consuming guesswork. of dental bridgework whereby all guesswork is eliminated. With guesswork virtually eliminated, the dentist can be sure of producing creditable bridgework everywhere, especially where fit and comfort is concerned.

A further object of this invention is to provide a tooth and bridge surveying analyzer for surveying and analyzing spaced teeth for the purpose of finding the optimum position to prepare the teeth for installation of a dental bridge.

A still further object of this invention is in the provision of a tooth and bridge surveying analyzer which receives a dental cast or model and may be manipulated to survey and analyze the teeth of the model and determine how the teeth are to be prepared so that that seating of a dental bridge will be insured.

A still further object of this invention is to provide a tooth and bridge surveying analyzer including a dental cast supporting and positioning frame and a parallel visualizing stand which may be easily and economically manufactured, and quickly and easily operated for the purpose of surveying and analyzing teeth on a dental cast.

Another object of this invention is to provide a tooth and bridge surveying analyzer including a dental cast supporting and positioning frame and a parallel visualizing stand, wherein the frame may be accurately angulated into almost any position for determining parallelism of spaced divergent teeth on which is to be installed a fixed dental bridge.

A still further object of this invention is to provide a tooth and bridge analyzer including a dental cast supporting and positioning frame and a parallel visualizing stand wherein parallelism can be accurately established on the two spaced teeth for purposes of preparing the teeth to receive a dental bridge that can be installed without interference.

Another object of this invention is to provide a tooth and bridge surveying analyzer which is simple to operate for surveying and analyzing teeth in the planning of dental bridgework.

Other objects, features, and advantages of the invention will be apparent from the following detailed disclosure, taken in conjunction with the accompanying sheets of drawings, wherein like reference numerals refer to like parts, in which:

FIG. 1 is a perspective view of the tooth and bridge surveying analyzer of the present invention;

FIG. 2 is a top plan view of the dental cast supporting and positioning frame of the tooth and bridge surveying analyzer;

FIG. 3 is a front elevational view of the dental cast supporting and positioning frame;

FIG. 4 is a side elevational view of the dental cast supporting and positioning frame;

FIG. 5 is an end elevational view of the parallel visualizing stand according to the invention;

FIG. 6 is a bottom perspective view of the dental cast supporting and positioning frame;

FIG. 7 is a front elevational view of the tooth and bridge surveying analyzer, illustrating the mounting of a dental cast in the dental cast supporting and positioning frame and the view of the teeth against the background of the parallel visualizing stand;

FIG. 8 is a view similar to FIG. 7, but illustrating the dental cast supporting and positioning frame in a position obtained after surveying and analyzing of the teeth on the dental cast, and also illustrating how the analyzed position is maintained; and FIG. 9 is a view similar to FIG. 8, but illustrating the dental cast supporting and positioning frame at an angle with respect to the parallel visualizing stand for the study of the teeth in another position.

Referring to the drawings and especially to FIG. 1, the tooth and bridge surveying analyzer of the present invention, designated by the numeral 10, includes a dental cast supporting and positioning frame 11 and a parallel visualizing stand 12.

The dental cast supporting and positioning frame 11 includes a generally U-shaped frame member 13 having a plurality of upstanding ears 14, 15 and 16. The ears 14 and 16 are parallel spaced and mounted on leg portions 17 and 18 of the frame, while the ear 15 is mounted on the bight portion 19 of the frame. The ears have threadedly mounted therein adjustable arms 20, 21 and 22, the axes of which converge toward a common point at the center of the frame. Each of the adjustable arms is provided with a pointed inner end which is adapted to be positioned within the confines of the U-shaped frame member 13 for the purpose of clamping a dental cast thereto such as the dental cast 23 of FIGS. 7 and 9, and is in the form of a screw. Thus, the dental cast is mounted by selectively turning the screws or arms 20, 21 and 22 to a position for holding the cast to the frame.

The dental cast 23, which would be made from an impression, includes a base 24 representing the gum or gingiva of the patient and a pair of spaced teeth 25 and 26. It may be noted in FIGS. 7 and 8 that the screws or arms 20 are arranged adjacent the upper ends of the ears 14, 15 and 16 so that when the base of the dental cast 23 is secured to the frame member 13, the teeth 25 and 26 project well above the components of the frame to provide an unobstructed viewing structure of the teeth against the background of the visualizing stand 12.

Arranged at the outer ends of the frame leg portions 17 and 18 and at the juncture between the leg portions and the bight portion 19 are adjustable frame legs 27, 28, 29 and 30 in the form of screws threadedly received in tapped holes extending through the frame member. These legs parallel each other and extend perpendicular to a plane extending through the frame member 13. By adjusting the legs, any desirable angulation of the frame member and a dental cast supported thereby can be obtained. The dental cast supporting and positioning frame 11 is adapted to be received on a flat surface 31, such as plate glass, when analyzing of a dental cast is to be made.

The parallel visualizing stand 12 includes an upstanding plate 32, generally rectangular in configuration, and a supporting member 33 extending from the lower edge of the plate, FIGS. 1 and 5. A line card or paper sheet 34 may be suitably secured to the outer surface of the plate 32, such as by the fasteners 35, wherein the card 34 includes a plurality of substantially vertically extending parallel lines 36. The stand 12 is adapted to be set on the same supporting surface which supports the frame 11. It may be desirable to adjust the positioning of the stand 12 and, for this purpose, adjusting screws 37 are provided at each corner of the supporting member 33. The head of each adjusting screw extends above the supporting member 33, while the body is threadedly engaged in a tapped hole in the member and the outer free end thereby extends below the member and into actual engagement with the supporting surface of the stand. The adjusting screws 37, however, can be dispensed with if this parallel visualizing stand is bent so that its supporting base is at right angle to the upstanding plate 32. Also the paper sheet 34 can be dispensed with when parallel lines 36 are placed directly on the upstanding plate 32 and are perpendicular to a flat surface 31 such as a glass plate.

The components of the tooth and bridge analyzer of the present invention, including the frame 11 and the stand 12, may be made from metal, plastic, or any other suitable material.

When it is desired to study and analyze teeth for the purpose of making dental bridgework, an impression is made of the teeth and area concerned. From the impression, a dental cast and model is made which would then be mounted on the dental cast supporting and positioning frame 11 by manipulation of the adjustable arms or screws 20, 21 and 22, until the cast is properly secured thereto as illustrated in FIG. 7. The frame with the cast is then positioned directly in front of the parallel visualizing stand on the flat surface 31. The eye of the dentist observes the relationship between the long axis of one tooth to the long axis of the other tooth, wherein the teeth are to carry the dental bridge. In the illustration of FIGS. 7 and 8, the long axis of the tooth 25 is indicated by the dotted line 38, while the long axis of the tooth 26 is indicated by the dotted line 39, wherein it is noted that the teeth 25 and 26 are divergent. Accordingly, the teeth may then be observed in the mesio-distal and bucco-lingual or in case of anterior teeth in labio-lingual directions. This is easily accomplished since the dental cast 23 is supported by the frame 11, which may be easily positioned in any direction relative to the stand 12. For example, FIG. 9 illustrates the frame and dental cast positioned such that the middle arm 21 is angularly positioned relative to the stand rather than being perpendicular thereto as in FIGS. 7 and 8.

If both teeth on the cast are comfortably parallel to each other as viewed against the vertical lines 36 on the stand 12, the teeth may be considered, analyzed and marked on the buccal or labial, lingual, mesial or distal sides of the teeth with parallel lines corresponding to the vertical lines on the stand for purposes of transferring to the teeth in the mouth these parallel lines which become guides for preparing the teeth.

However, if the teeth to be analyzed are divergent as in the illustrations of FIGS. 7 and 8, the dentist must determine from the point of anatomy, esthetics, teeth size, and nearness of the pulp as to which tooth is to be favored. Generally, the favored tooth would be the one most often seen by someone observing the patient or the one closest to the front of the mouth. If there is no difference between the two teeth, the smaller tooth is generally favored. Since it is always the object of the dentist to preserve the vitality of the teeth and if the normally favored tooth is found by means of an X-ray to have a more deeply seated pulp (nerve) and thus would allow deeper cutting without encroaching on the pulp, the other tooth would be favored.

Then by adjusting the legs on the frame, the optimum position of the teeth is obtained while observing the teeth against the background of the stand. This optimum position is shown in FIG. 8 with the dental cast illustrated. The legs are turned during adjusting of the frame until the optimum position of the favored tooth mesio-distally and bucco-lingually is accomplished. During this preparation, the frame may be turned at any angle relative to the stand.

Similarly, adjusting of the frame position may be made when more than two teeth are used to support a single dental bridge. The optimum position of all of the teeth can be obtained by means of adjusting the four legs on the frame.

Upon completely analyzing the teeth, parallel lines are copied on all surfaces of the teeth that can be reached, such as the lines 40 and 41, FIG. 8, whereby these lines may be easily transferred to the teeth in the mouth and used as a guide for the cutting instruments in obtaining parallelism when preparing the teeth.

Further, the teeth may be marked with lines or areas on the buccal or labial, lingual, mesial and distal sides of the teeth in the places to be cut and prepared, such as shown by the shaded areas 42, 43, 44, and 45, FIG. 8.

The parallel lines, such as the lines of FIG. 8, can easily be transferred onto the natural teeth by employing a shellac base-plate which is heated and shaped over the tooth on the model. Then it is marked and a channel is cut along the mark of the approximate width of a lead pencil, whereby application of the base-plate form on the natural tooth will permit the use of a lead pencil in the channel for marking the teeth.

If it is desired to retain the analyzed position of the teeth and remove the dental cast from the frame, a plurality of glass plates or shims 46, FIG. 8, may be stacked beneath the dental cast to support an amount of plaster 47 which, after setting up, will retain the analyzed position of the dental cast when it is removed from the frame. This will free the surveying analyzer for analyzing other bridgework as needed.

At any time during the preparation of the teeth, a dental cast or model of the prepared teeth may be made and checked in the above described manner to assure that the preparations are parallel to each other. And after completing the preparation, a dental cast or model may be made to check the parallelism of the teeth which, if found to be correct, will insure proper seating of a finished dental bridge.

After the prepared teeth have been checked, the dentist may then without fear of failure proceed to cast gold abutments for completing the bridge, knowing that the analysis which was made through use of the present invention will permit the bridge to seat easily and properly.

In view of the foregoing, it is seen that the present invention provides a tooth and bridge surveying analyzer which make be quickly and easily operated to study and analyze teeth during the preparation of dental bridgework to assure accurate and excellent results to the satisfaction of the dentist and the patient.

It will be understood that modifications and variations may be effected without departing from the scope of the novel concepts of the present invention, but it is understood that this application is to be limited only by the scope of the appended claims.

The invention is claimed as follows:

1. A method of analyzing and surveying two or more spaced natural teeth in the preparation of bridgework therefor comprising the steps of making an impression of the teeth and area about the teeth, making a dental cast from the impression to provide artificial teeth, mounting the dental cast on a frame adapted to rest on a flat surface and to be adjustable for angulating the dental cast relative to the flat surface, arranging the frame supported dental cast in line with a reference means having a plurality of lines extending vertically relative to the flat surface, aligning the long axes of the artificial teeth with the lines on said reference means, and adjusting the frame to angulate the dental cast whereby the optimum position of the artificial teeth is obtained.

2. A method of analyzing and surveying two or more spaced natural teeth in the preparation of bridgework therefor comprising the steps of making an impression of the teeth and area about the teeth, making a dental cast from the impression to provide artificial teeth, mounting the dental cast on a frame adapted to rest on a flat surface and to be adjustable for angulating the dental cast relative to the flat surface, arranging the frame supported dental cast in line with a reference means having a plurality of lines extending vertically relative to the flat surface, aligning the long axes of the artificial teeth with the lines on said reference means, adjusting the frame to angulate the dental cast whereby the optimum position of the artificial teeth is obtained, and copying lines on the artificial teeth parallel to lines on the reference means to determine and obtain parallelism when preparing the natural teeth.

3. A method of analyzing and surveying two or more spaced natural teeth in the preparation of bridgework therefor comprising the steps of making an impression of the teeth and area about the teeth, making a dental cast from the impression to provide artificial teeth, mounting the dental cast on a frame adapted to rest on a flat surface and to be adjustable for angulating the dental cast relative to the flat surface, arranging the frame supported dental cast in line with a reference means having a plurality of lines extending vertically relative to the flat surfaces, aligning the long axes of the artificial teeth with the lines on said reference means, adjusting the frame to angulate the dental cast whereby the optimum position of the artificial teeth is obtained, copying lines on the artificial teeth parallel to lines on the reference means to determine and obtain parallelism when preparing the natural teeth, and marking areas on the artificial teeth to be cut and prepared on the natural teeth.

References Cited in the file of this patent

UNITED STATES PATENTS

| | | |
|---|---|---|
| 1,296,643 | Fish | Mar. 11, 1919 |
| 1,733,895 | Matheson | Oct. 29, 1924 |
| 2,091,885 | Saidel | Aug. 31, 1937 |
| 2,434,415 | Kile | Jan. 13, 1948 |
| 2,724,899 | Stoll | Nov. 29, 1955 |

FOREIGN PATENTS

| | | |
|---|---|---|
| 1,157,582 | France | Dec. 30, 1957 |
| 472,713 | France | Aug. 17, 1914 |
| 494,249 | Italy | May 18, 1954 |